(12) United States Patent
Hashida et al.

(10) Patent No.: US 12,024,228 B2
(45) Date of Patent: Jul. 2, 2024

(54) AUTOMOBILE SUSPENSION

(71) Applicants: TOYOTA JIDOSHA KABUSHIKI KAISHA, Toyota (JP); SUBARU CORPORATION, Tokyo (JP)

(72) Inventors: Shigenori Hashida, Nisshin (JP); Yukihiko Nakagawa, Nisshin (JP); Osamu Shimasaki, Nisshin (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 303 days.

(21) Appl. No.: 17/713,810

(22) Filed: Apr. 5, 2022

(65) Prior Publication Data

US 2022/0324515 A1 Oct. 13, 2022

(30) Foreign Application Priority Data

Apr. 9, 2021 (JP) ................................. 2021-066445

(51) Int. Cl.
| | |
|---|---|
| *B62D 21/15* | (2006.01) |
| *B60G 7/00* | (2006.01) |
| *B60G 7/02* | (2006.01) |
| *B60G 7/04* | (2006.01) |
| *B60G 99/00* | (2010.01) |
| *B62D 21/11* | (2006.01) |

(52) U.S. Cl.
CPC .............. *B62D 21/15* (2013.01); *B60G 7/00* (2013.01); *B60G 7/02* (2013.01); *B60G 7/04* (2013.01); *B60G 99/002* (2013.01); *B60G 2204/1431* (2013.01); *B60G 2206/016* (2013.01); *B62D 21/11* (2013.01); *B62D 21/155* (2013.01)

(58) Field of Classification Search
CPC ...... B62D 21/15; B62D 21/11; B62D 21/155; B60G 7/00; B60G 2204/1431; B60G 2206/016; B60G 7/02; B60G 7/04; B60G 99/002
USPC .................................................... 296/187.09
See application file for complete search history.

(56) References Cited

U.S. PATENT DOCUMENTS 7,318,494 B2 * 1/2008 Takahiko ............... B62M 27/02
180/193

FOREIGN PATENT DOCUMENTS

| JP | 2005-014728 A | | 1/2005 |
| JP | 2014-080090 A | | 5/2014 |
| JP | 2014080090 A | * | 5/2014 |

* cited by examiner

*Primary Examiner* — Amy R Weisberg
*Assistant Examiner* — Dana D Ivey
(74) *Attorney, Agent, or Firm* — Dinsmore & Shohl LLP

(57) ABSTRACT

An automobile suspension includes a side rail extending in a front-rear direction of a vehicle body, a lower arm, and a bracket linking the lower arm to the side rail. A front end of the side rail and a rear end of the side rail are linked to a frame of the vehicle body, and the side rail curves such that a middle of the side rail is lower than at least one of the front end and the rear end. The bracket includes a pair of side plates that supports a shaft of the lower arm and is joined to a side face of the side rail, and an upper plate that links the side plates and is joined to an upper face of the side rail.

3 Claims, 6 Drawing Sheets

AUTOMOBILE SUSPENSION

CROSS-REFERENCE TO RELATED APPLICATION

This application claims priority to Japanese Patent Application No. 2021-066445 filed on Apr. 9, 2021, incorporated herein by reference in its entirety.

BACKGROUND

1. Technical Field

The technology disclosed in the present specification relates an automobile suspension.

2. Description of Related Art

Automobile suspensions include side rails linked to a frame of a vehicle body, and lower arms supported by the side rails. The side rails and the lower arms are linked by brackets (e.g., Japanese Unexamined Patent Application Publication No. 2014-80090 (JP 2014-80090 A)). Japanese Unexamined Patent Application Publication No. 2005-14728 (JP 2005-14728 A) discloses a suspension provided with reinforcing ribs and a crush bead. By providing the reinforcing ribs, the rigidity of the suspension is ensured against force applied from the road surface when traveling. On the other hand, the suspension collapses with the crush bead as a starting point, when encountering a frontal collision, which reduces the impact at the time of the collision.

SUMMARY

The present specification provides an automobile suspension that can increase rigidity against force applied from the road surface and effectively reduce impact when encountering a frontal collision, by refining the shape of a bracket that links the side rail of the suspension and the lower arm.

A first aspect disclosed in the present specification is an automobile suspension. The automobile suspension includes a side rail, a lower arm, and a bracket. A front end and a rear end of the side rail are linked to a frame of a vehicle body, the side rail extending in a front-rear direction of the vehicle body, and the side rail curving such that a middle of the side rail is lower than at least one of the front end and the rear end. The bracket links the lower arm to the side rail. The bracket includes a pair of side plates that supports a shaft of the lower arm and is joined to a side face of the side rail, and an upper plate that links the side plates and is joined to an upper face of the side rail. A ridge line at a boundary between one of the side plates and the upper plate is curved such that the ridge line becomes lower nearer to the side rail. The upper plate is provided with a reinforcing bead that becomes narrower nearer to the side rail as viewed from above.

In the first aspect, by bending the side rail, the side rail is readily deformed when encountering a frontal collision. On the other hand, the force applied from the road surface when traveling travels from the lower arm to the side rail via the bracket. The reinforcing bead on an upper face of the bracket increases the rigidity of the bracket, and increases the rigidity of the entire suspension against the force applied from the road surface. The reinforcing bead particularly increases the rigidity of the bracket with regard to a load in a vehicle-width direction that is applied from the lower arm.

In the first aspect, the reinforcing bead has a tapered shape as viewed from above. On the other hand, the ridge line at a boundary between each side plate of the bracket and the upper plate thereof is curved so as to become lower nearer to the side rail. The side rail is curved such that the middle thereof is lower than at least one of the front end and the rear end, and the middle of the side rail deforms when encountering a frontal collision. The bracket is strong and does not readily collapse, and accordingly the side rails bend in front of or behind the bracket under a collision load. The impact is reduced by the side rails bending when encountering a frontal collision. According to the first aspect, rigidity with regard to the force applied from the road surface is high, and impact can be effectively reduced when encountering a frontal collision.

In the first aspect, the upper face of the side rail may be provided with a stepped portion that is low on a side nearer to a middle of the vehicle body and high on a side farther from the middle of the vehicle body, and the stepped portion may gradually deepen from both ends in the front-rear direction of the vehicle body toward the middle of the stepped portion. The ridge line of the bracket may be situated at a deepest portion of the stepped portion in a longitudinal direction of the side rail. According to the above configuration, the road surface force traveling to the side rail through the ridge lines is dispersed in the vehicle body front-rear direction of the side rails.

In the first aspect, a ridge line of the reinforcing bead may be a straight line as viewed along the front-rear direction of the vehicle body. Note that the ridge line of the reinforcing bead may imply a boundary between an upper face and a side face of the reinforcing bead. The rigidity of the bracket in the vicinity of the reinforcing bead is further increased, and as a result, the load passing through the ridgeline of the bracket is reduced. According to the above configuration, the stress generated at the intersection of the ridge line of the bracket and the side rail can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
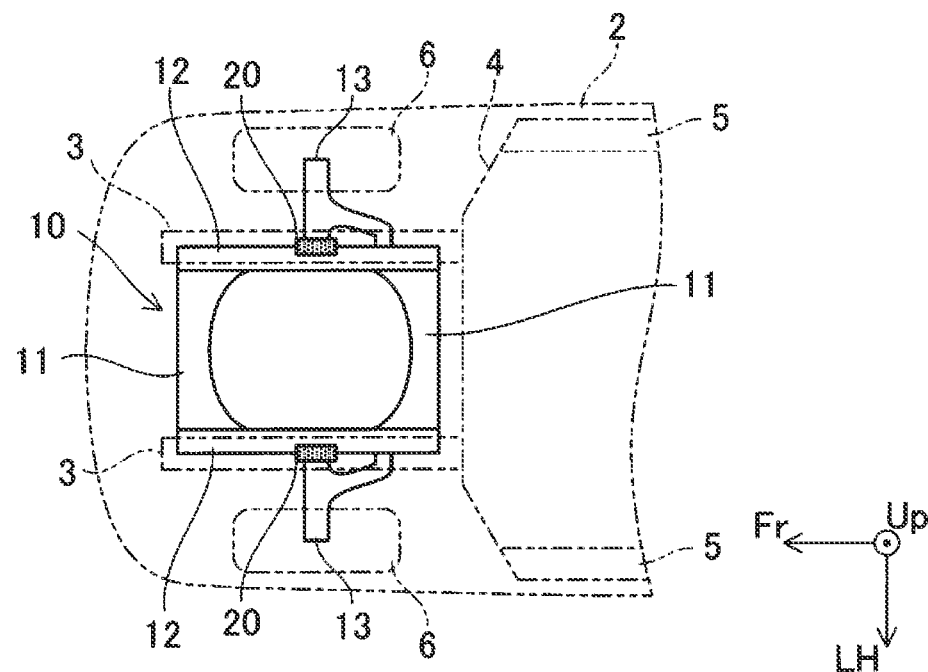
FIG. 1 is a plan view of a frontal portion of a vehicle body.
Figure 2:
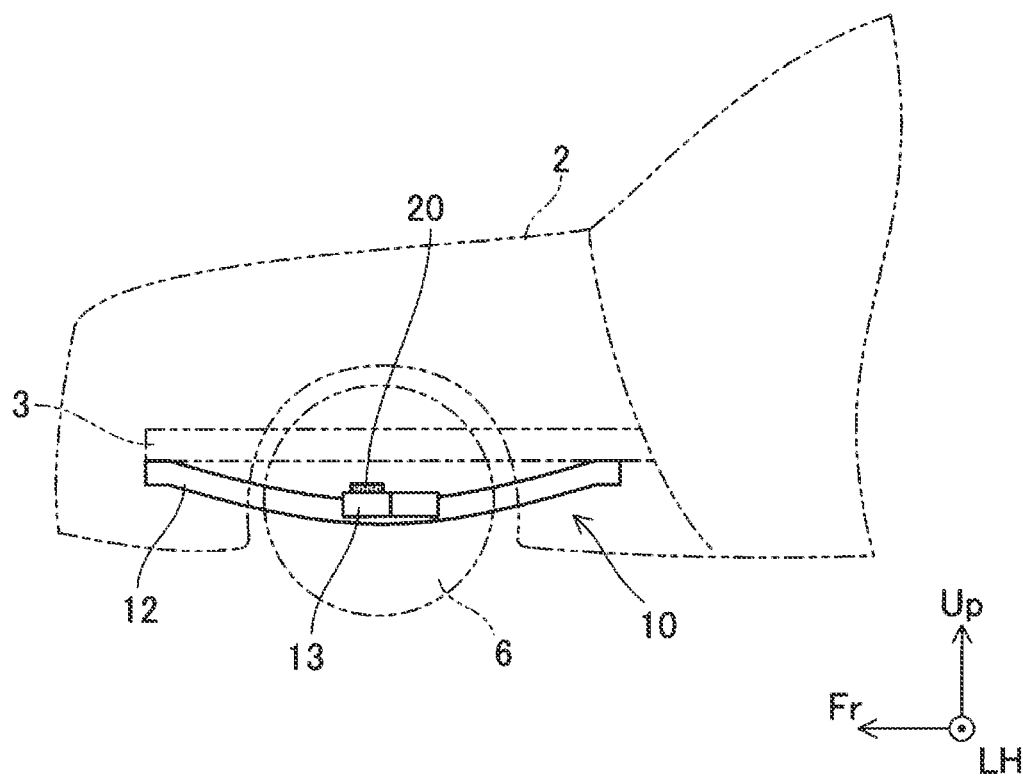
FIG. 2 is a side view of the frontal portion of the vehicle body.

A suspension 10 according to an embodiment will be described with reference to the drawings. FIG. 1 is a plan view of a frontal portion of a vehicle body 2 including the suspension 10, and FIG. 2 is a side view of the frontal portion of the vehicle body 2. Note that Fr, Up, and LH in the coordinate system in FIGS. 1 and 2 indicate forward, upward, and leftward of the vehicle body 2, respectively. The meanings of the axes of the coordinate system are also the same in the other drawings as well. In the following description, the direction of the axis LH may be referred to as a vehicle-width direction.

The vehicle body 2 includes front side members 3, a dash panel 4, and rockers 5, as a frame that maintains strength. A pair of the front side members 3 extends in a front-rear direction of the vehicle body 2 at the front portion of the vehicle body 2. Front ends of the front side members 3 are linked to a bumper reinforcement (omitted from illustration), and rear ends of the front side members 3 are linked to the dash panel 4. The dash panel 4 is a partitioning plate between a front compartment of the vehicle body 2 and the cabin thereof. The dash panel 4 is linked to front ends of the rockers 5 being a pair. In FIGS. 1 and 2, the front side members 3, the dash panel 4, and the rockers 5 are drawn as hidden outlines such that the structure of the suspension 10 can be clearly understood.

The suspension 10 includes two cross members 11, two side rails 12, and two lower arms 13. In addition to these parts, the suspension 10 also is provided with hub carriers, an anti-roll bar, dampers, coil springs, and so forth, which are omitted from illustration.

A pair of side rails 12 extends in the front-rear direction of the vehicle body 2, and a pair of the cross members 11 links the side rails 12. The suspension 10 is linked to the front side members 3 being a pair. More specifically, front ends and rear ends of the side rails 12 of the suspension 10 are linked to the front side members 3 (i.e., the frame of the vehicle body 2).

One lower arm 13 is linked to each side rail 12. The lower arm 13 is an arm that supports a tire wheel 6. More specifically, a distal end of the lower arm 13 supports a hub carrier (omitted from illustration) in the vicinity of the tire wheel 6, and a basal portion thereof is linked to the side rail 12. The hub carrier supports a drive shaft (omitted from illustration), and the tire wheel 6 is linked to a distal end of the drive shaft.

The lower arm 13 is branched into a lower main arm 13a and a strut 13b on the side near to the side rail 12, and the lower main arm 13a and the strut 13b are each linked to the side rail 12, which will be described in detail later. The lower main arm 13a is linked to the side rail 12 by a bracket 20. The strut 13b is linked to the side rail 12 by a separate bracket (omitted from illustration).

Figure 3:
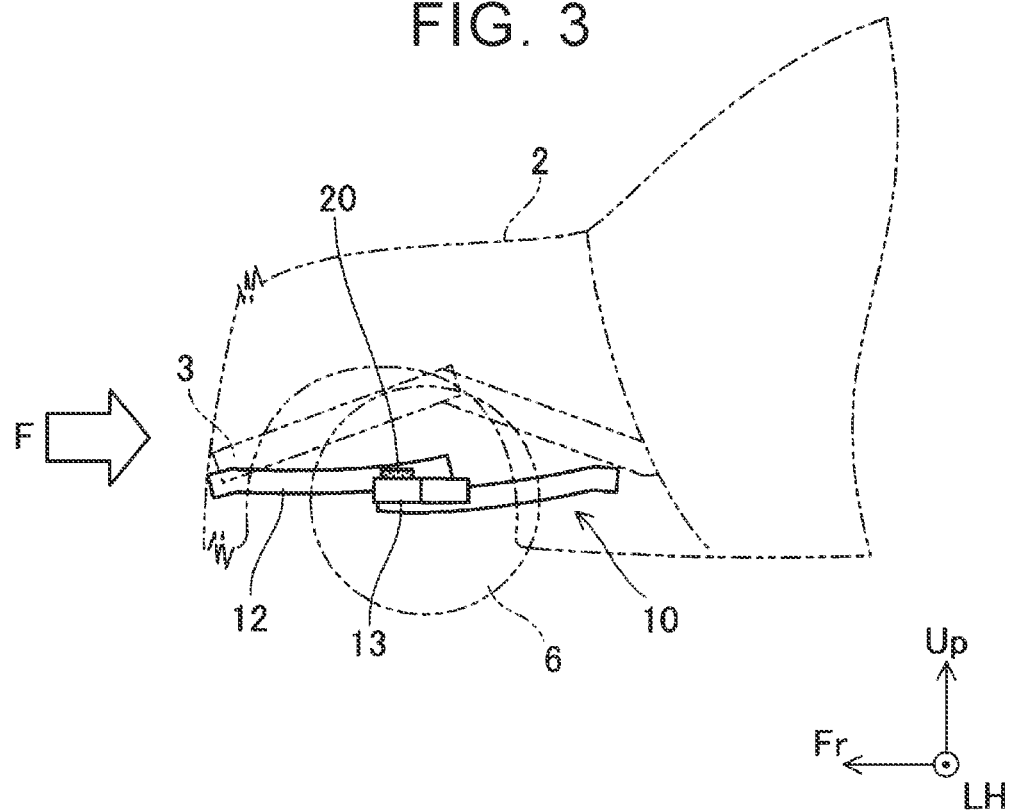
FIG. 3 is a side view of the frontal portion of the vehicle body (when deformed)

FIG. 3 is a side view of when the front portion of the vehicle body 2 is deformed by a collision load F. When the collision load F is applied from the front of the vehicle body 2, the front side member 3 and the side rail 12 of the suspension 10 are deformed, and the impact is reduced. The side rail 12 is curved, with the middle thereof being lower than both ends, so as to be easily bent at the middle when a forward collision load is applied (see FIG. 2).

Figure 4:
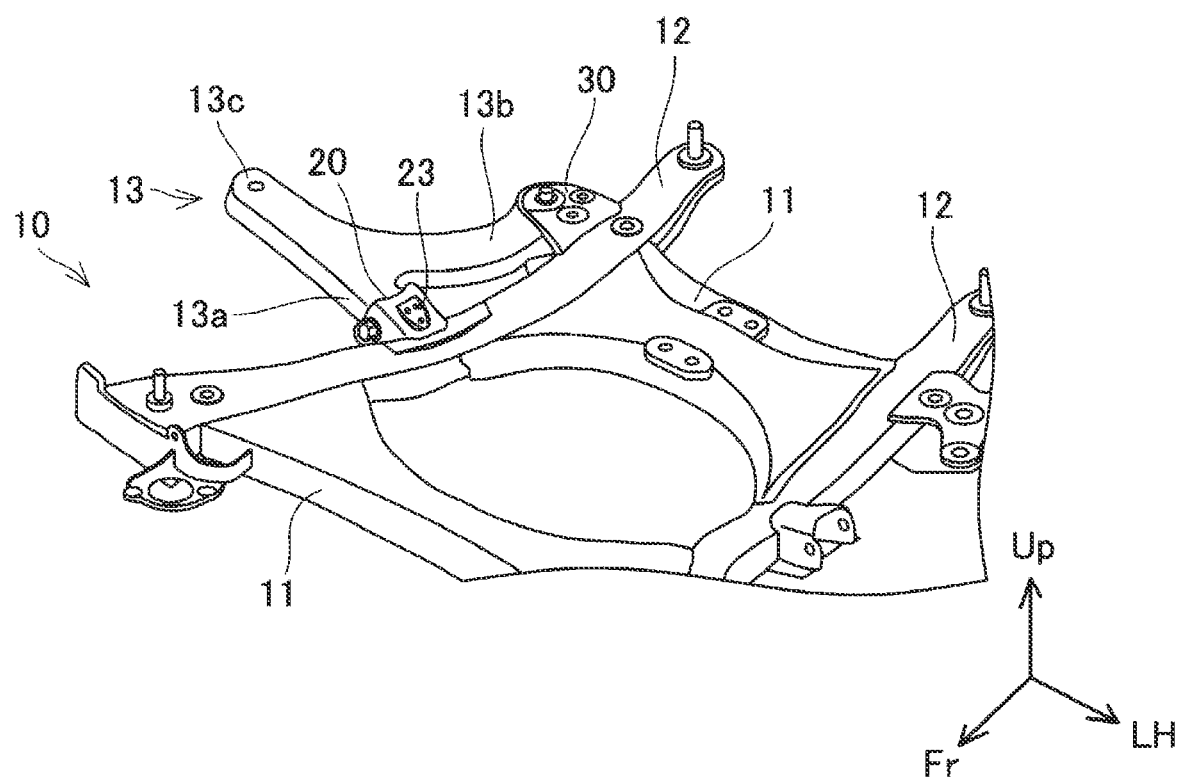
FIG. 4 is a perspective view of a suspension.

The structure of the bracket 20 will be described below in detail. FIG. 4 is a perspective view of the suspension 10. In FIG. 4, part of the side rail 12 and the lower arm on the left side is omitted from illustration. The suspension 10 is bilaterally symmetrical, and the structure around the bracket 20 on the right side will be described below.

As described above, the lower arm 13 is branched into the lower main arm 13a and the strut 13b on the side rail 12 side. The lower main arm 13a is linked to the side rail 12 by the bracket 20, and the strut 13b is linked to the side rail 12 by a bracket 30. A distal end 13c supports the hub carrier (omitted from illustration), and the hub carrier supports the drive shaft.

The lower arm 13 conveys force applied from the road surface to the side rail 12, through the tire wheel and the hub carrier. The distal end 13c of the lower arm 13 swings up and down with the brackets 20 and 30 as fulcrums. The up-down directional force of the vibrations applied from the road surface is applied to the coil spring and the damper (omitted from illustration). Part of the force applied from the road surface also travels to the side rail 12 through the lower arm 13. The distal end 13c of the lower arm 13 and the lower main arm 13a are laid out in the vehicle-width direction, and the force applied to the lower arm 13 from the road surface travels to the side rail 12 mainly via the lower main arm 13a. That is to say, a large force in the vehicle-width direction is applied to the bracket 20. Note that the strut 13b is mainly subjected to force applied to the distal end 13c of the lower arm 13 in the front-rear direction.

A reinforcing bead 23 is provided on an upper face of the bracket 20. The reinforcing bead 23 will be described later.

Figure 5:
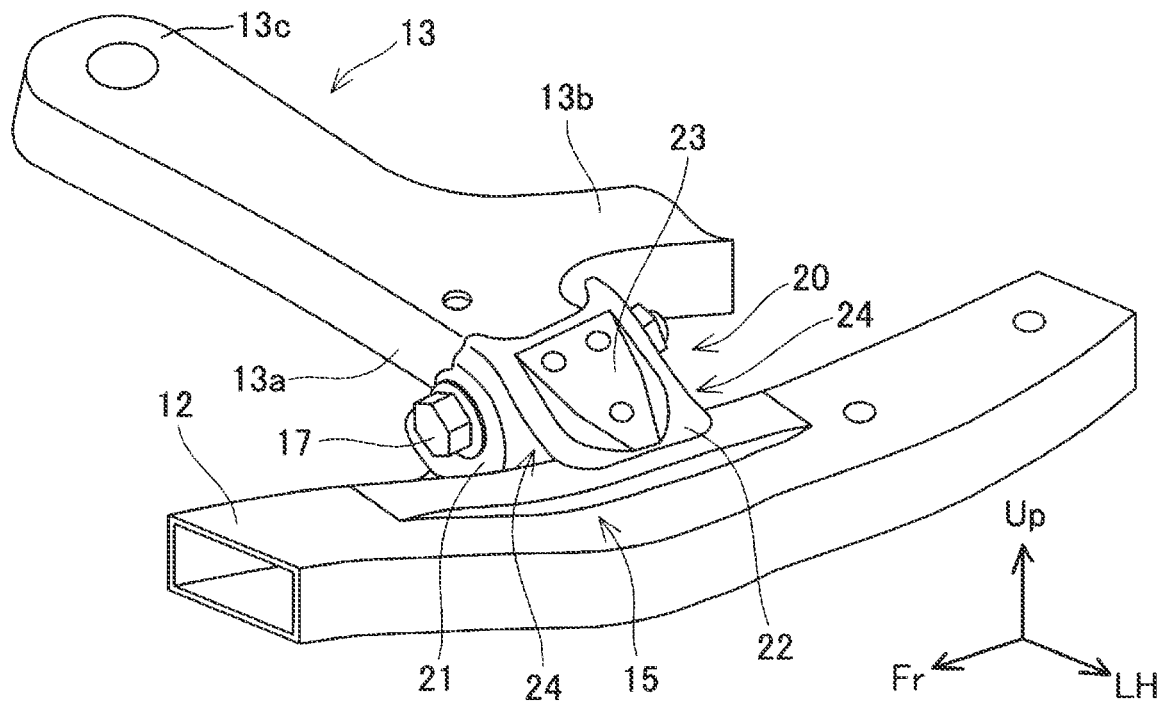
FIG. 5 is an enlarged view of the vicinity of a bracket (1)
Figure 6:
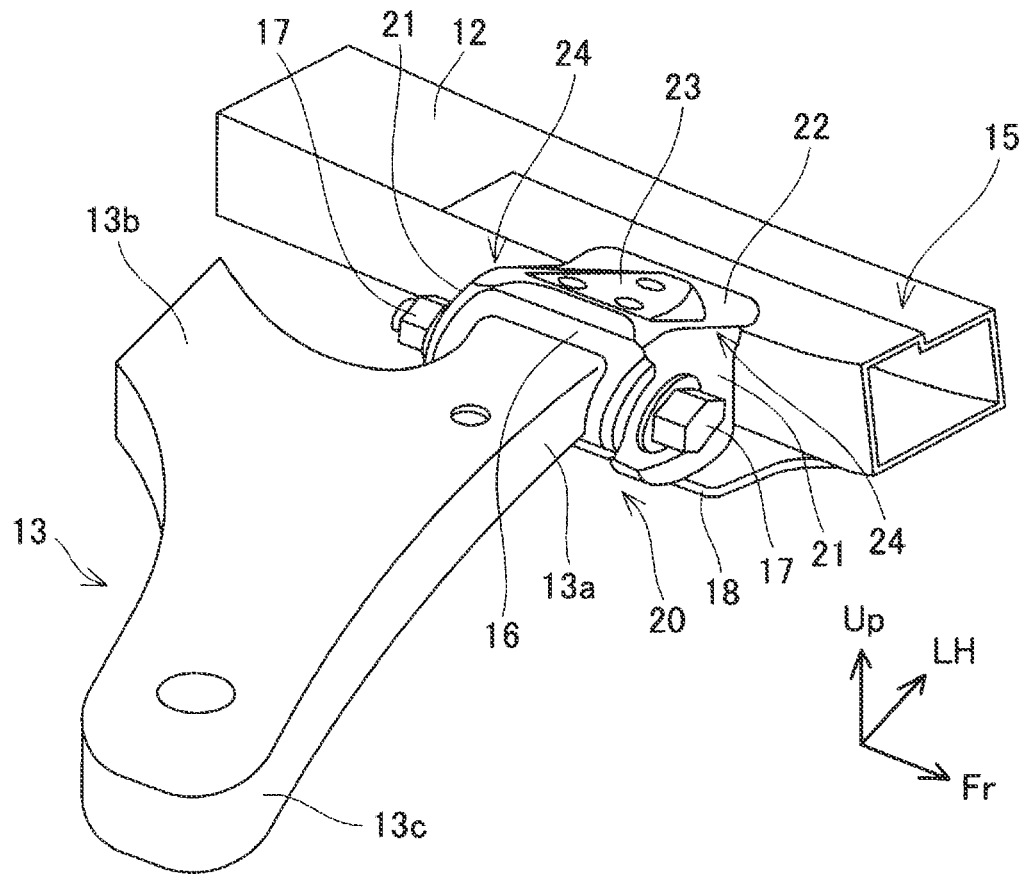
FIG. 6 is an enlarged view of the vicinity of the bracket (2)

FIGS. 5 and 6 are enlarged views of the vicinity of the bracket 20. The bracket 20 includes an upper plate 22 and a pair of side plates 21. The side plates 21 support a shaft 16 of the lower arm 13, and are joined to the side face of the side rail 12. The shaft 16 of the lower arm 13 is linked to the side plates 21 (bracket 20) by bolts 17. The distal end 13c of the lower arm 13 swings up and down about the shaft 16. The upper plate 22 links the side plates 21, and is joined to an upper face of the side rail 12. A support plate 18 extends from a bottom face of the side rail 12, and the side plates 21 are also joined to the support plate 18. The bracket 20 has a box structure, and furthermore the bracket 20 is welded to the entire range of contact with the side rail 12 (including the support plate 18). The box structure and broad range of welding increase the strength of the bracket 20. Accordingly, when a collision load is applied from a forward direction, the side rail 12 bends in front of or behind the bracket 20.

A stepped portion 15 is provided on the upper face of the side rail 12. The upper plate 22 of the bracket 20 is joined in the vicinity of the stepped portion 15. The stepped portion 15 will be described in detail later.

A ridge line 24 at the boundary between each side plate 21 and the upper plate 22 is curved so as to become lower nearer to the side rail 12. Also, the upper plate 22 is provided with the reinforcing bead 23. As viewed from above, the reinforcing bead 23 becomes narrower the nearer to the side rail 12. The term "reinforcing bead" refers to an elongated protrusion formed by stamping a metal plate. The reinforcing bead 23 increases the rigidity of the bracket 20.

Figure 7:
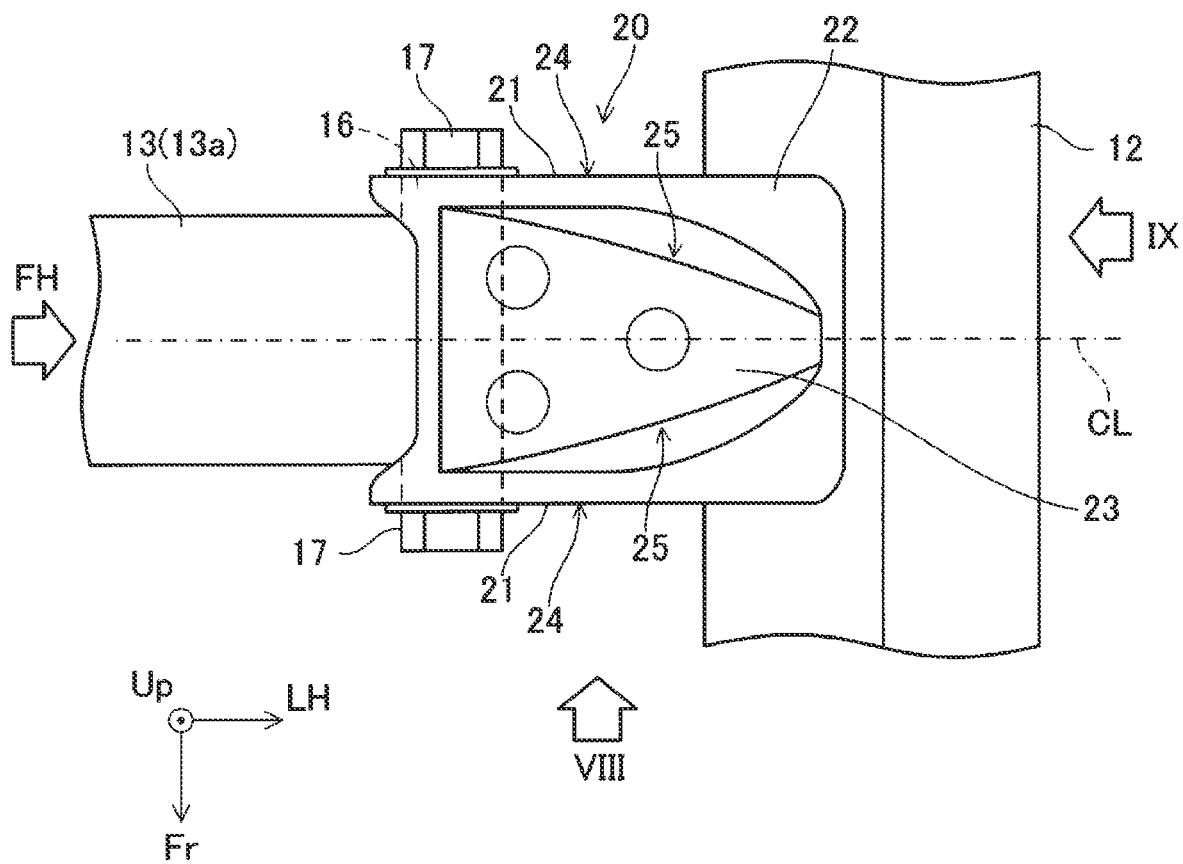
FIG. 7 is a plan view of the bracket and the vicinity thereof.
Figure 8:
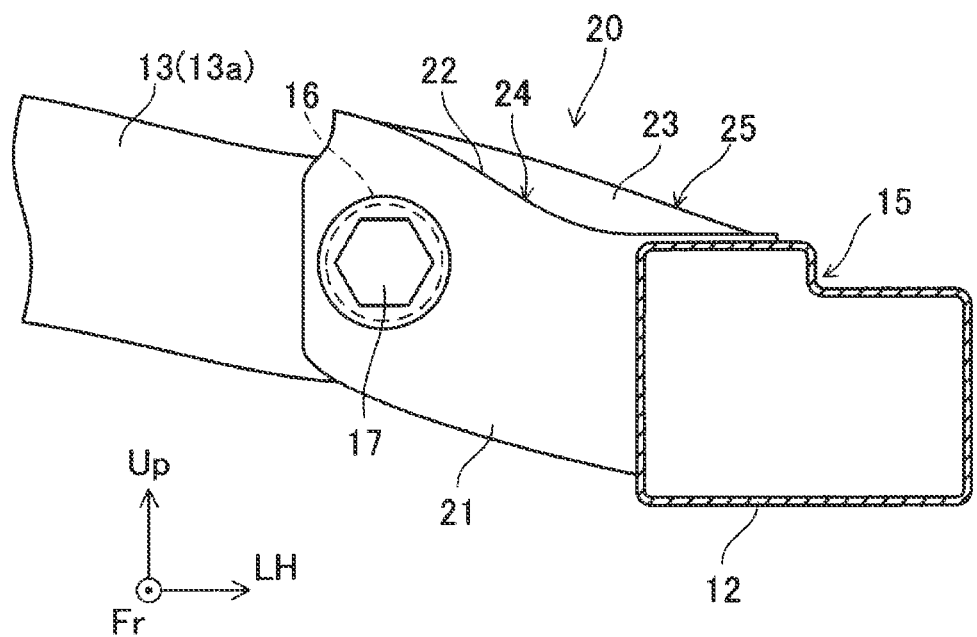
FIG. 8 is a side view as viewed from the direction of arrow VIII in FIG. 7.
Figure 9:
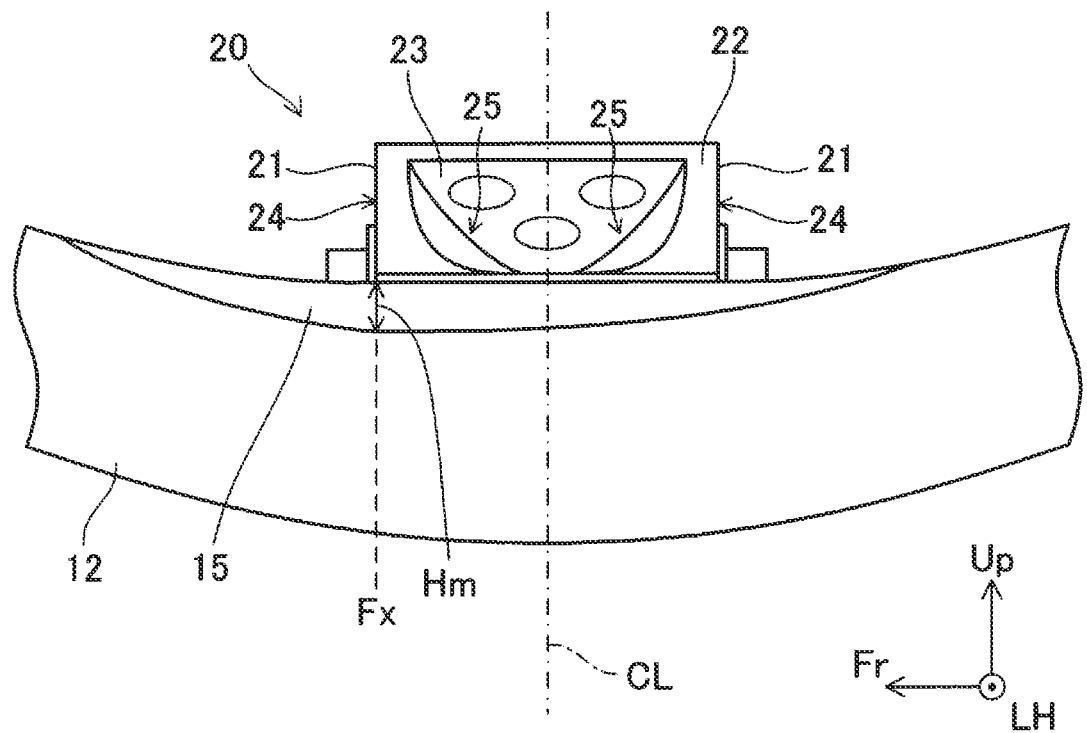
FIG. 9 is a front view as viewed from the direction of arrow IX in FIG. 7.

The advantages obtained from the structure of the bracket 20 will be described with reference to FIGS. 7 through 9. FIG. 7 is a plan view of the bracket 20 and the vicinity thereof. FIG. 8 is a side view as viewed from the direction of arrow VIII in FIG. 7, and FIG. 9 is a front view as viewed from the direction of arrow IX in FIG. 7. The long dashed short dashed lines CL in FIGS. 7 and 9 each indicate the center line of the bracket 20. The support plate 18 illustrated in FIG. 6 is omitted from illustration in FIGS. 7 and 8.

FIG. 8 illustrates a section of the side rail 12. The side rail 12 is a square tube that is hollow inside. The stepped portion 15 is provided on the upper face of the side rail 12.

As illustrated in FIG. 2, the side rail 12 is curved such that the middle is lower than both ends in the front-rear direction of the vehicle body 2. The bracket 20 is attached to the middle of the side rail 12. The side rail 12 is curved downward, and accordingly the middle of the side rail 12 is deformed when encountering a frontal collision, and the impact is reduced.

The reinforcing bead 23 provided on the upper plate 22 of the bracket 20 increases the rigidity of the bracket 20. By increasing the rigidity of the bracket 20, the overall rigidity of the suspension 10 is increased with regard to the force applied from the road surface. In particular, as illustrated in FIG. 7, the reinforcing bead 23 is provided at the middle of the bracket 20, and is tapered toward the side rail 12, as viewed from above. A distal end of the reinforcing bead 23 reaches the upper face of the side rail 12. Force FH in the vehicle-width direction that travels to the lower arm 13 is concentrated at the center of the bracket 20 (center line CL), and accordingly the tapered reinforcing bead 23 located on the center line CL withstands the force FH well. The force FH is mainly vibration force applied from the road surface during traveling. The bracket 20 provided with the reinforcing bead 23 increases the rigidity of the suspension 10 with regard to traveling vibration.

The ridge line 24 at the boundary between each side plate 21 and the upper plate 22 is curved so as to become lower nearer to the side rail 12, as illustrated in FIG. 8. As illustrated in FIG. 7, the ridge lines 24 are present on both edges of the upper plate 22. Both of the ridge lines 24 being a pair are curved so as to become lower nearer to the side rail 12.

The rigidity of the bracket 20 is high at the center, due to being provided with the reinforcing bead 23. On the other hand, the ridge lines 24 are curved, and accordingly the bracket 20 tends to bend in the vicinity of the ridge lines 24.

Ridge lines 25 of the reinforcing bead 23 are substantially straight lines as viewed from the front-rear direction (Fr direction) of the vehicle body 2, which is illustrated well in FIG. 8. The straightness of the ridge lines 25 of the reinforcing bead 23 also contributes to increasing the rigidity of the bracket 20 in the vehicle-width direction. Note that each ridge line 25 of the reinforcing bead 23 implies the boundary between the upper face and the side face of the reinforcing bead 23.

Further, as illustrated in FIGS. 5, 8 and 9, the upper face of the side rail 12 is provided with the stepped portion 15, of which the side nearer to the middle of the vehicle body 2 in the vehicle-width direction is low, and the side farther from the middle of the vehicle body 2 is high. The stepped portion 15 gradually becomes deeper from both ends thereof toward the middle thereof, along a longitudinal direction of the side rail 12 (the front-rear direction of the vehicle body 2). As illustrated in FIG. 9, the stepped portion 15 is the deepest (depth Hm) at a position Fx in the longitudinal direction of the side rail 12. One of the ridge lines 24 of the bracket 20 matches the deepest position Fx of the stepped portion 15. Due to the above relationship between the stepped portion 15 of the side rail 12 and the ridge lines 24 of the bracket 20, the force traveling from the lower arm 13 through the ridge lines 24 is dispersed in a front-rear direction of the side rail 12. The force traveling from the lower arm 13 through the ridge lines 24 is dispersed well in the direction from the ridge line 24 corresponding to the deepest position Fx toward the other ridge line 24. In some embodiments, the ridge line 24 that matches the deepest position Fx of the stepped portion 15 is the ridge line on the side opposite to the ridge line on the side of the strut 13b (see FIGS. 4 and 5).

Figure 10:
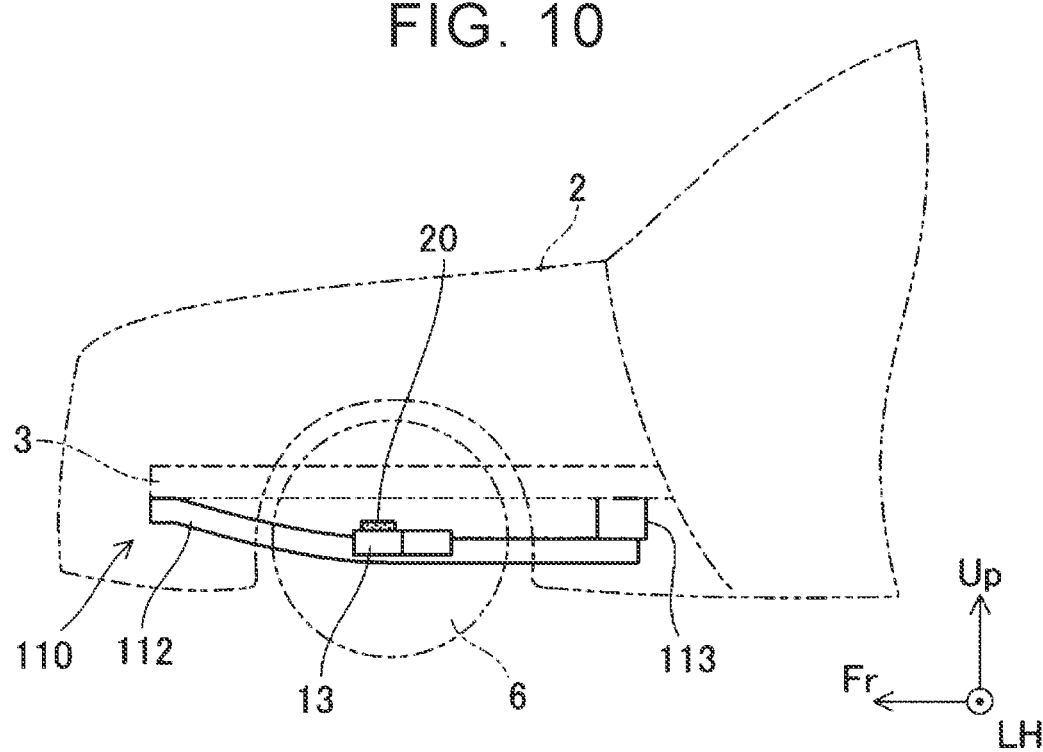
FIG. 10 is a side view of a suspension according to a first modification.

FIG. 10 is a side view of a suspension 110 according to a first modification. A front end of a side rail 112 of the suspension 110 is directly linked to the front side member 3, and a rear end thereof is linked to the front side member 3 via a spacer 113. The side rail 112 is curved such that the middle thereof is lower than the front end, and is located at the same height as the rear end.

Figure 11:
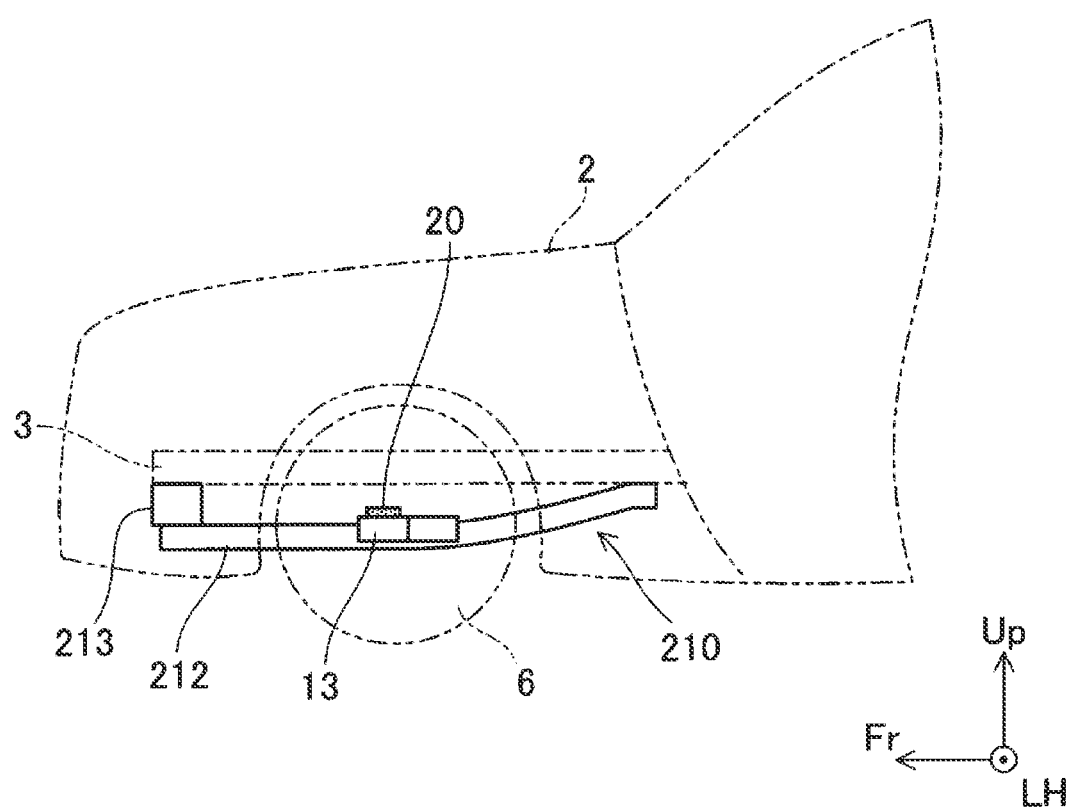
FIG. 11 is a side view of a suspension according to a second modification.

FIG. 11 is a side view of a suspension 210 according to a second modification. A rear end of a side rail 212 of the suspension 210 is directly linked to the front side member 3, and a front end thereof is linked to the front side member 3 via a spacer 213. The side rail 212 is curved so that the middle thereof is lower than the rear end, and is located at the same height as the front end.

As illustrated in FIGS. 10 and 11, in an arrangement in which the middle of the side rail is curved so as to be lower than at least one of the front end and the rear end, the same effect as that of the suspension 10 of the embodiment can be obtained. In other words, the side rail may be curved such that the middle thereof is situated below a virtual straight line passing through the front end and the rear end.

Points to be noted regarding the technology described in the embodiment will be described. The suspension 10 according to the embodiment has a shape in which two side rails 12 are linked by two cross members 11. It is sufficient for the suspension to have side rails of which both ends are linked to the frame of the vehicle body. That is to say, the technology disclosed in the present specification can be applied to a suspension that includes no cross member 11. Also, the lower arm 13 according to the embodiment is a wishbone type, in which the side close to the side rail 12 is branched into two. The technology disclosed in the present specification can also be applied to a suspension including a lower arm that is not of the wishbone type.

While specific examples of the disclosure are described in detail above, these examples are merely exemplary, and are not intended to limit the scope of the claims. The technology described in the claims includes various modifications and alterations of the specific examples described above. The technical elements described in the present specification or the drawings have technical utility alone or in various combinations, and are not limited to the combinations described in the claims as originally filed. The technology exemplified in the present specification or the drawings may achieve a plurality of objects at the same time, and has technical utility by achieving one of the objects.

What is claimed is:

1. An automobile suspension comprising:
 a side rail extending in a front-rear direction of a vehicle body, a front end of the side rail and a rear end of the side rail being linked to a frame of the vehicle body, the side rail curving such that a middle of the side rail is lower than at least one of the front end and the rear end;
 a lower arm; and
 a bracket linking the lower arm to the side rail, wherein the bracket includes
  a pair of side plates that supports a shaft of the lower arm and is joined to a side face of the side rail, and
  an upper plate that links the side plates and is joined to an upper face of the side rail;
 a ridge line at a boundary between one of the side plates and the upper plate is curved such that the ridge line becomes lower nearer to the side rail; and
 the upper plate is provided with a reinforcing bead that becomes narrower nearer to the side rail as viewed from above.

2. The automobile suspension according to claim 1, wherein:

the upper face of the side rail is provided with a stepped portion that is low on a side nearer to a middle of the vehicle body and high on a side farther from the middle of the vehicle body; and the stepped portion gradually deepens from both ends in the front-rear direction of the vehicle body toward a middle of the stepped portion, and the ridge line is situated at a deepest portion of the stepped portion in a longitudinal direction of the side rail.

3. The automobile suspension according to claim 1, wherein a ridge line of the reinforcing bead is a straight line as viewed along the front-rear direction of the vehicle body.

* * * * *